J. HIST.
COMBINED LAND ROLLER AND HARROW.
APPLICATION FILED FEB. 16, 1912.
1,069,660.
Patented Aug. 5, 1913.
2 SHEETS—SHEET 2.
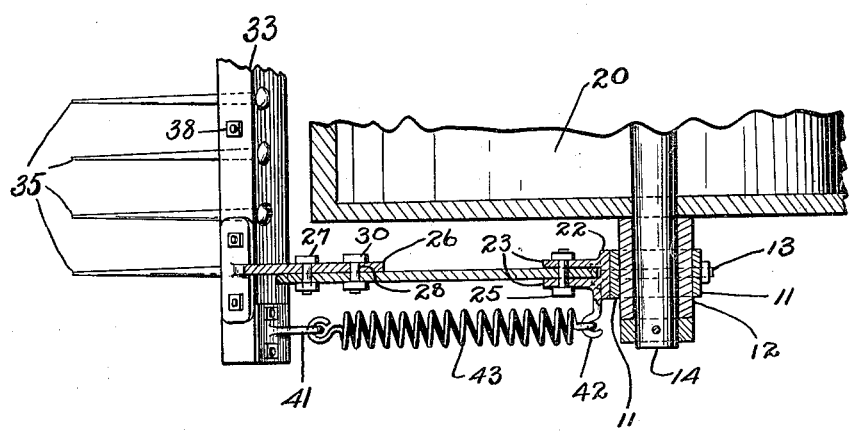
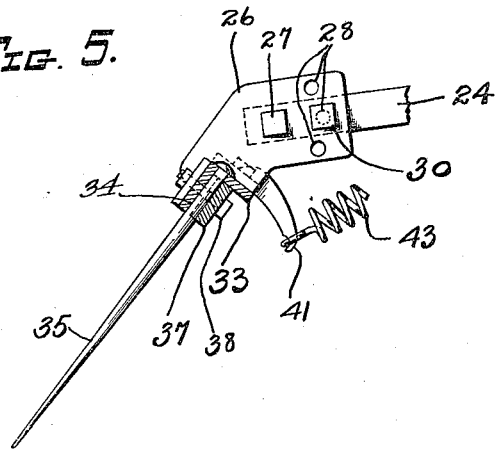
Witnesses:
H. J. Gettins.
N. L. McDonnell.
Inventor:
John Hist
by Lynch & Dyer
his Attorneys.

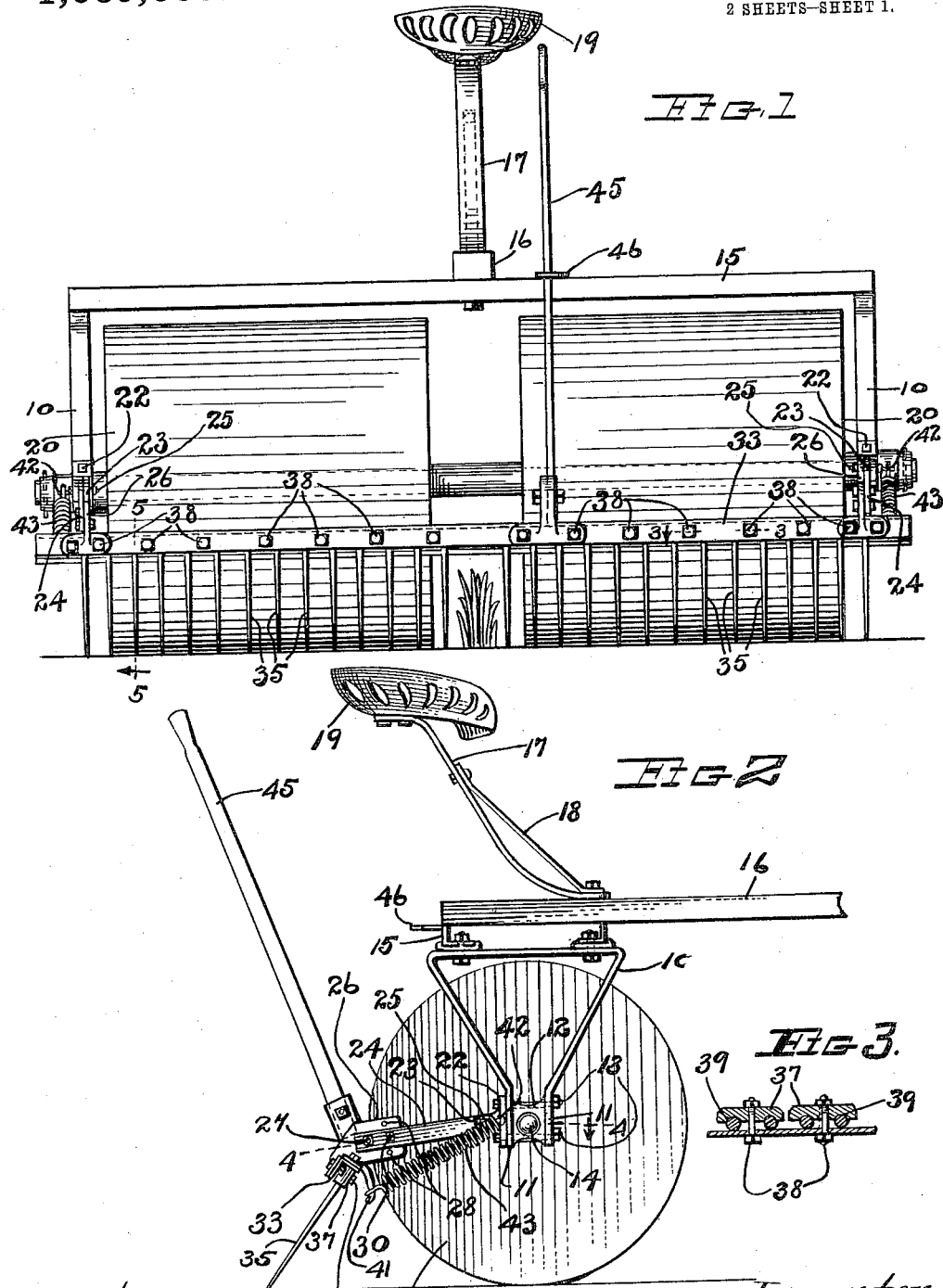

UNITED STATES PATENT OFFICE.

JOHN HIST, OF BEREA, OHIO, ASSIGNOR TO THE DUNHAM CO., OF BEREA, OHIO, A CORPORATION OF OHIO.

COMBINED LAND-ROLLER AND HARROW.

1,069,660.  Specification of Letters Patent.  Patented Aug. 5, 1913.

Application filed February 16, 1912. Serial No. 677,902.

*To all whom it may concern:*

Be it known that I, JOHN HIST, a citizen of the United States of America, residing at Berea, in the county of Cuyahoga and State of Ohio, have invented certain new and useful Improvements in Combined Land-Rollers and Harrows; and I hereby declare the following to be a full, clear, and exact description of the invention, such as will enable others skilled in the art to which it pertains to make and use the same.

This invention relates to new and useful improvements in a combined land roller and harrow.

One object of this invention is to provide an implement of this character which can be used as a land roller alone or can be used as a combined land roller and harrow.

A further object of my invention is to provide an implement of this character having the harrow mounted at the rear of the rollers so that the harrow will loosen the top soil after the rollers have passed over it, thereby preventing a crust forming on the soil with the resulting cracks and fissures which permit the escape of moisture from the soil.

A still further object of my invention is to provide an implement of this character which can be utilized for rolling and harrowing between the rows of plants after the plants are up so as to cultivate the soil and destroy the weeds.

With these objects in view and to the end of securing other advantages which will hereinafter appear, my invention consists in the features of construction and combination of parts, the preferred form of which is illustrated in the accompanying drawings, described in the specification and set forth in the claims.

In the accompanying drawings Figure 1 is a rear elevation of a land roller embodying my invention. Fig. 2 is an end elevation of the same. Fig. 3 is a section on line 3—3, Fig. 1. Fig. 4 is a section on line 4—4, Fig. 2. Fig. 5 is a section on line 5—5, Fig. 1.

Referring to the drawings it will be seen that the machine comprises a main frame and a harrow frame arranged at the rear of the main frame and pivotally secured thereto.

10 represents the hangers of the main frame which are triangular in shape. The ends of the hangers are provided with extensions or plates 11, between which are secured bearings 12 by means of bolts 13. In the bearings 12 is journaled the roller carrying axle 14. At the top of the hangers 10 is mounted a cross frame 15 to which is secured a draft bar 16. On the draft bar 16 is mounted a standard 17 which is preferably reinforced by a brace bar 18. At the upper end of the standard 17 is mounted a seat 19. On the axle 14 are mounted a pair of rollers 20 which are of the usual construction and are spaced apart on the axle the requisite distance so that when the roller is drawn over the land which is being cultivated there will be sufficient space between the rollers to accommodate one or more rows of plants.

The harrow frame is mounted and arranged as follows:—To the plate 11 at the rear side of each bearing 12 is secured a plate 22 which is provided with a pair of ears 23. These plates 22 are secured in position by the same bolts 13 which clamp the bearings 12 between said plates 11. Between the ears 23 on each of the plates 22 is pivoted one end of an arm 24 by means of a pin 25. To the free end of each of the arms 24 is secured a bracket member 26 by means of a pin 27 so that said bracket member can turn up or down on said arm. At the inner end of each bracket member 26 are formed a series of openings 28 and in each arm 24 is formed an opening 29 which is arranged to register with the openings 28 in the bracket member mounted thereon. Pins 30 are provided for locking each bracket member against movement on its supporting arm, one pin 30 being passed through the opening 29 in each arm and through any one of the openings in the bracket member supported thereon according to the tilt which is desired to be given to the said bracket member. An angle bar 33 extends between the said bracket members 26 and the ends thereof are secured to said bracket members 26. In one of the legs of the angle bar 33 are formed a series of openings 34 through which the spike 35 which form the teeth of the harrow are passed and the arrangement of the openings 34 is such that after the spikes 35 have passed therethrough the upper ends of said spikes will lie flat against the other leg of the angle bar. In order to lock the said spikes in position and at the same time provide for the ready removal thereof in case one becomes bent or broken, a series of clamping plates are provided, shown at 37, each clamping plate being just long enough to span two of the spikes. Each clamping plate 37 is secured to the angle bar 33 by a bolt 38 and in the face of each clamping plate 37 are preferably formed a pair of seats 39 which partially receive the ends of the spikes.

It will be readily seen that in case it is desired to remove one of the spikes it will be necessary to loosen only one of the clamping plates so that only two of the spikes will be loosened up instead of the whole row of spikes as is now the case. The spikes are, of course, arranged in series to correspond to the location of the rollers and when a space is left between the rollers a similar space is left between the series of spikes. When it is desired a small roller can be inserted between the main rollers in which case additional spikes would be inserted in the harrow frame at the rear of said additional roller. At each end of the angle bar 33 is secured a hook 41 and to each of the plates 22 is secured a hook 42. In order to secure the proper tension on the harrow frame a coil spring 43 is provided at each end of the frame and one end of each spring 43 is secured to a hook 42 and the other end is secured to a hook 41. To the angle bar 33 is secured a handle bar 45 and on the rear side of the cross frame 15 is mounted a hook 46. When it is desired to place the harrow out of commission the handle bar 45 is drawn up toward the seat which of course swings up the harrow frame so that the teeth are no longer in contact with the ground and the handle bar is then sprung in behind the hook 46 which holds it in position.

What I claim is,—

1. In a combined land roller and harrow, a main frame, journals mounted in said main frame, an axle mounted in said journals, rollers mounted on said axle, a harrow frame extending transversely of said main frame at the rear of said rollers, means pivotally connecting the harrow frame to the main frame, said means comprising a pair of arms, each arm being rotatably mounted on the said axle and rigidly secured to said harrow frame and a pair of springs, each spring being connected at one end to the main frame and at its other end to the harrow frame at a point below the pivotal connection of the harrow frame to the main frame.

2. In a combined land roller and harrow, a main frame, an axle journaled in said main frame, rollers mounted on said axle, a harrow frame arranged at the rear of said rollers, said harrow frame comprising a pair of arms, one arm being pivotally secured at each end of the main frame, a bracket member pivotally secured to each arm at the free end thereof, each bracket member and each arm being provided with openings which register with each other, pins arranged to extend through the registering openings in said bracket members and said arms, a bar extending between and supported at its ends by said bracket members, spikes supported by and extending downwardly from said bar and a spring arranged at each end of said main frame, one end of each spring being connected to said main frame, and the other end being connected to said bar, for the purpose set forth.

3. In a combined land roller and harrow, a main frame, an axle journaled in said main frame, rollers mounted on said axle, a harrow frame arranged at the rear of said rollers, said harrow frame comprising a pair of arms, one arm being pivotally secured at each end of the main frame, a bracket member pivotally secured to the free end of each arm, means for locking said bracket members rigidly to said arms, an angle bar extending between and rigidly secured to said bracket members, one leg of said angle bar being provided with spike receiving openings, spikes mounted in said openings and a series of clamping members, each clamping member being arranged to engage a plurality of said spikes.

4. In a combined land roller and harrow, a main frame, said frame comprising cross members, hangers arranged to support said cross members, bearings mounted between said hangers, an axle mounted in said bearings, rollers mounted on said axle, a harrow frame arranged at the rear of said rollers, said harrow frame comprising a pair of plates secured to said hangers at the rear thereof, each plate being provided with a pair of ears, an arm pivoted at one end between each pair of ears, a bracket member secured to the free end of each arm and adjustable vertically thereon, a bar extending between said bracket members and secured thereto, spikes mounted on said bar, springs arranged at each end of said main frame, one end of each spring being connected to the ear carrying plate and the other end being connected to said bar of the harrow frame, a handle bar secured to the bar of the harrow and means arranged on the main frame for engaging said handle bar when said handle bar is moved toward said main frame to lift the harrow frame.

In testimony whereof, I sign the foregoing specification, in the presence of two witnesses.

JOHN HIST.

Witnesses:
W. J. DUNHAM,
J. R. DUNHAM.

Copies of this patent may be obtained for five cents each, by addressing the "Commissioner of Patents, Washington, D. C."